(12) United States Patent
Lee

(10) Patent No.: US 6,249,945 B1
(45) Date of Patent: Jun. 26, 2001

(54) HARD DISK BURNISHING HEAD

(75) Inventor: Wei-Ming Lee, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/190,946

(22) Filed: Nov. 12, 1998

(51) Int. Cl.$^7$ .................................................. B24B 39/00
(52) U.S. Cl. ........................ 29/90.01; 451/290; 451/317
(58) Field of Search ........................ 29/90.01; 451/527, 451/528, 530, 547, 290, 317, 324

(56) References Cited

U.S. PATENT DOCUMENTS

| | | | | |
|---|---|---|---|---|
| 4,330,910 | * | 5/1982 | Schachl et al. ........................ | 29/90 R |
| 4,412,400 | * | 11/1983 | Hammond ................................ | 51/58 |
| 5,063,712 | * | 11/1991 | Hamilton et al. ........................ | 51/67 |
| 5,782,680 | * | 7/1998 | Pilsan .................................... | 451/317 |
| 5,863,237 | * | 1/1999 | Felts et al. .............................. | 451/41 |
| 5,866,806 | * | 2/1999 | Nishio et al. ............................ | 51/297 |
| 5,880,899 | * | 3/1999 | Blachek et al. .......................... | 360/66 |
| 5,980,369 | * | 11/1999 | Burga et al. ............................. | 451/317 |
| 6,019,672 | * | 2/2000 | Damgaard .............................. | 451/527 |
| 6,099,390 | * | 8/2000 | Nishio et al. ............................ | 451/36 |

FOREIGN PATENT DOCUMENTS

| | | | | |
|---|---|---|---|---|
| 5981058 | * | 5/1984 | (JP) ..................................... | 29/90.01 |
| 4315816 | * | 11/1992 | (JP) ..................................... | 29/90.01 |
| 10-134347 | * | 5/1998 | (JP) ..................................... | 29/90.01 |
| 10143860 | * | 5/1998 | (JP) ..................................... | 29/90.01 |
| 10-293922 | * | 11/1998 | (JP) ..................................... | 29/90.01 |

* cited by examiner

Primary Examiner—S. Thomas Hughes
Assistant Examiner—Essama Omgba
(74) Attorney, Agent, or Firm—Robert O. Guillot; Oppenheimer Wolff & Donnelly LLP

(57) ABSTRACT

The burnishing head for hard disk processing includes a solid body having generally rectangular surfaces, including an upper surface, a burnishing pad surface, a front surface, a rear surface and two side surfaces. A plurality of burnishing pads are disposed upon the burnishing pad surface. The pads are shaped such that each pad has a burnishing edge that is generally parallel to said front surface and therefore orthogonal to the direction of media travel. The burnishing pads are preferably configured such that two frontward leading pads are disposed proximate the front surface in a spaced apart relationship and one leading middle pad is disposed rearwardly of the two frontward leading pads and generally between the two frontward leading pads. Two rear pads are disposed generally rearwardly of the leading middle pad in a spaced apart relationship, and one rearward pad is disposed rearwardly of the two rear pads and generally between the two rear pads. In the preferred embodiment the pads are generally triangular in shape and the outer surface of the leading and rearward pads may be tapered. The method for manufacturing the burnishing head, includes the steps of making a series of parallel cuts in a surface of a solid body of material. The burnishing pads result from material that remains following the cuts.

11 Claims, 2 Drawing Sheets

HARD DISK BURNISHING HEAD

BACKGROUND OF THE INVENTION

1. Field of the Invention

The present invention relates generally to burnishing devices for hard disks, and more particularly to a burnish head having a plurality of burnishing pads.

2. Description of the Prior Art

A hard disk is cleaned and burnished following the deposition of thin film layers to remove debris and asperities from the surface. Such debris and asperities must be removed, or at least reduced in height, such that a slider will fly smoothly over the disk surface. As slider flying heights become lower for improved higher density disks, the disks must be burnished to a greater extent than was heretofore necessary lower the projection height of such asperities and more efficiently remove disk surface debris.

Several different burnishing pad designs are currently utilized. Some heads have a burnishing ridge providing a burnishing edge that extends across the entire front surface of the head. Other current head designs have burnishing members on the left side and right side of the burnishing head, but have a lengthwise channel between the left and right burnishing members. In such heads, a significant portion of the burnishing head does not burnish the disk, resulting in significant inefficiency in the burnishing process.

A further prior art burnishing head is described in U.S. Pat. No. 4,845,816. It has a waffle type pattern of burnishing pads; that is, a plurality of diamond shaped burnishing pads that are disposed on the burnishing head surface. The diamond shaped pads are oriented such that the point of each diamond shaped pad is directed towards the media to be burnished. In distinction to this pad configuration, burnishing pads of the present invention each have a straight burnishing edge that is directed towards the media to be burnished. In a prior art variation of this waffle patterned head the leading burnishing pads may be triangularly shaped, as are the leading pads of the present invention.

A need therefore exists for improvements in burnishing heads that remove debris and asperities to a greater degree than has been previously necessary. The present invention provides a burnishing head with a plurality of burnishing pads in a unique configuration that accomplishes these results.

SUMMARY OF THE INVENTION

The burnishing head for hard disk processing includes a solid body having generally rectangular surfaces, including an upper surface, a burnishing pad surface, a front surface, a rear surface and two side surfaces. A plurality of burnishing pads are disposed upon the burnishing pad surface. The pads are shaped such that each pad has a burnishing edge that is generally parallel to said front surface and therefore orthogonal to the direction of media travel. The burnishing pads are preferably configured such that two frontward leading pads are disposed proximate the front surface in a spaced apart relationship and one leading middle pad is disposed rearwardly of the two frontward leading pads and generally between the two frontward leading pads. Two rear pads are disposed generally rearwardly of the leading middle pad in a spaced apart relationship, and one rearward pad is disposed rearwardly of the two rear pads and generally between the two rear pads. In the preferred embodiment the pads are generally triangular in shape and the outer surface of the leading and rearward pads may be tapered. The method for manufacturing the burnishing head, includes the steps of making a series of parallel cuts in a surface of a solid body of material. The burnishing pads result from material that remains following the cuts.

It is an advantage of the present invention that a more efficient burnishing head is provided.

It is another advantage of the present invention that a burnishing head is provided having a plurality of burnishing pads, each of which includes a straight burnishing edge that is generally orthogonal to the direction of hard disk media travel.

It is a further advantage of the present invention that a burnishing head is provided that is easy to manufacture in quantity and maintain high accuracy.

It is yet another advantage of the present invention that a burnishing head is provided which includes two effective burnishing edges which extend across the width of the burnishing head.

These and other features and advantages of the present invention will become apparent to those skilled in the art upon reading the following detailed description which makes reference to the several figures of the drawings.

IN THE DRAWINGS

FIG. I is a perspective view of the burnish head of the present invention disposed in association with a hard disk;

DETAILED DESCRIPTION OF THE PREFERRED EMBODIMENTS

Figures 1, 2:
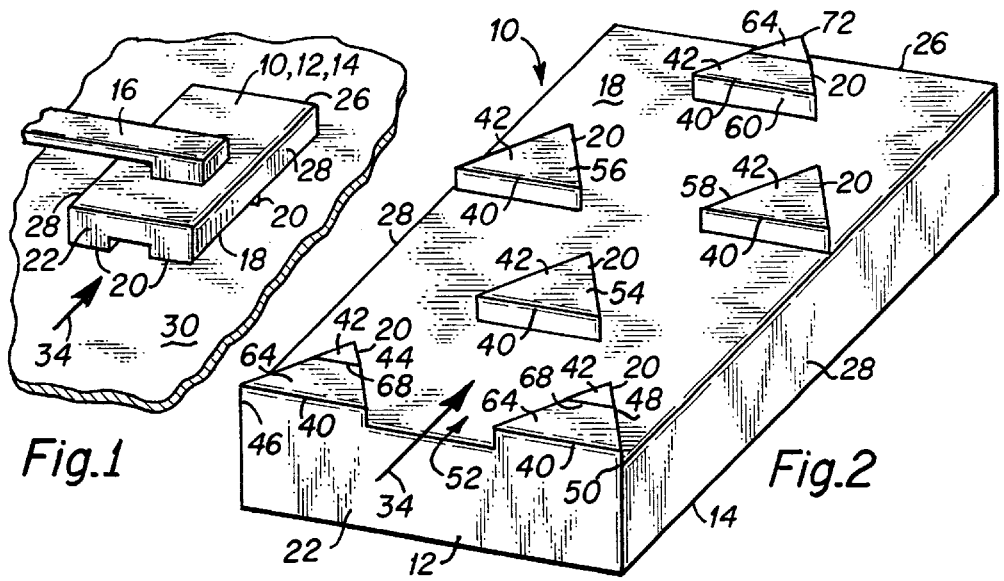
FIG. 2 is a perspective view of a preferred embodiment of the hard disk burnishing head of the present invention as depicted in FIG. 1.

As depicted in FIG. 1, the hard disk burnishing head 10 of the present invention is formed from a generally solid, rectangular body of ceramic material 12 having an upper surface 14 that is engagable with a generally depicted head support apparatus 16, a burnishing pad surface 18 having a plurality of burnishing pads 20 formed thereon, a front surface 22, a rear surface 26 and side surfaces 28. The head 10 is designed to burnish the surface of a hard disk 30 which rotates towards the front surface 22 in the direction of arrow 34. Further details of the burnishing head 10 are next described with the aid of FIGS. 2–6.

Figures 3, 5:
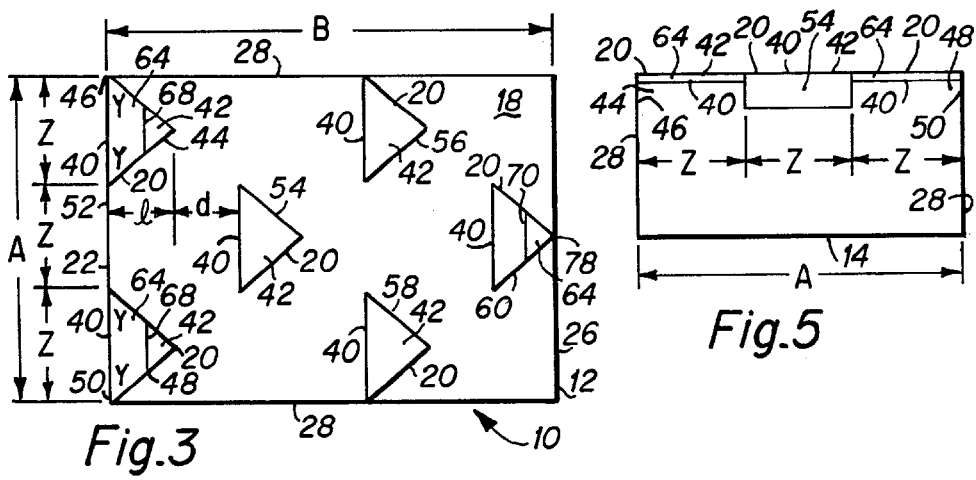
FIG. 3 is a top plan view of the burnishing head depicted in FIG. 2.
FIG. 5 is a front elevational view of the burnishing head depicted in FIG. 2.
Figures 4, 6:
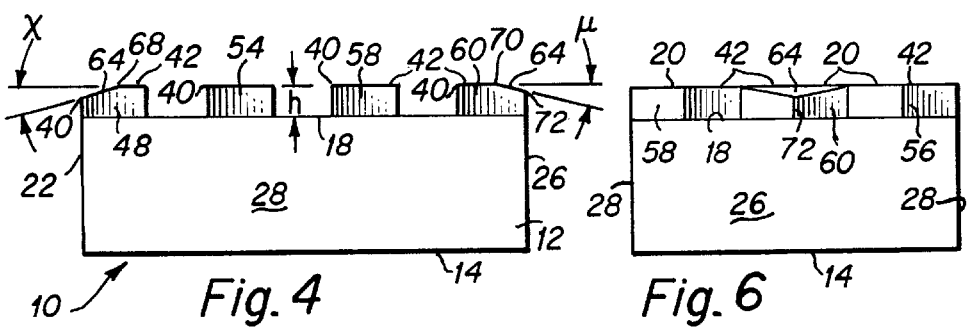
FIG. 4 is a side elevational view of the burnishing head depicted in FIG. 2.
FIG. 6 is a rear elevational view of the burnishing head depicted in FIG. 2.

As depicted in FIGS. 2–6, a plurality of burnishing pads 20 are formed on the burnishing pad surface 18 of the head 10. The burnishing pads 20 project outwardly from the surface 18, and each pad is preferably oriented such that a straight burnishing edge 40 of each pad 20 faces towards the front surface 22 of the head 10, whereby the burnishing edge 40 of each pad 20 is generally parallel to the front surface 22 and orthogonal to the media travel direction 34. Thus, the burnishing edge 40 of each pad 20 forms the leading pad edge for collecting debris and interacting with asperities disposed on the disk surface. Each burnishing pad 20 is preferably formed in a triangular shape and has a flat outer surface 42. The preferred pad configuration includes a left leading pad 44 formed on a left side edge 46 of the front surface 22, a right leading pad 48 formed on a right side edge 50 of the front surface 22. The pads 44 and 48 are spaced apart such that a gap 52 is formed between the pads 44 and 48. A third middle leading pad 54 is formed rearwardly and centrally of the pads 44 and 48, such that pad 54 occupies the gap 52 when the head 10 is viewed from the front, as depicted in FIG. 5. Two rear pads 56 and 58 are disposed rearwardly of pad 54, and are spaced apart in a similar manner to pads 44 and 48. A rearward pad 60 is disposed rearwardly and centrally of pads 56 and 58, such that it occupies the space between the pads 56 and 58 when the head 10 is viewed from the front, in a similar manner to pad 54.

As is best seen in the front view depicted in FIG. 5, the three leading triangular pads 44, 48 and 54 are sized and positioned such that the leading edges 40 of each pad 44, 48 and 54 are aligned such that when combined they effectively extend across the full width (A) of the front surface 22 with no gaps in the combined leading edge. That is, each front edge 40 of each triangular pad 20 has a length of A/3. Similarly, the three triangular pads 56, 58 and 60 are sized and positioned such that the leading edges 40 of these pads effectively extend across the width of the head 10 with no gaps in the combined leading edge thereof. The configuration of the triangular pads 20 on the head 10 can be thought of as two 3-pad sets, wherein each 3-pad set (specifically pad set 44, 48 and 54, and pad set 56, 58 and 60) combines to form an effective burnishing edge that extends across the width A of the head 10. Thus, each head 10 effectively has two combined burnishing edges that extend across its width A, one combined edge being formed from each set of 3 triangular pads. Therefore, each time the head 10 passes a particular location on the surface of a hard disk 30, two burnishing edges pass over the location.

In the preferred embodiment, enhanced head performance is obtained by modifications to the left and right leading burnishing pads 44 and 48 and the rearward burnishing pad 60. Specifically, to prevent gouging of the disk surface. the outer surface 42 of the left and right leading pads 44 and 48 is tapered. That is, as is best seen in the side view of FIG. 4, the outer surface 64 of pad 48 is tapered from a point 68 approximately ½ of the pad length back from the edge 40 at a slope angle x of approximately 1–3 degrees towards the front surface 22 to form the burnishing edge 40. The pad 44 is tapered in a similar manner as depicted in FIG. 3, Additionally. to prevent scratching of the hard disk surface by the rearward pad 60, the outer surface 64 of the pad 60 is tapered rearwardly from a point 70 towards the rear apex 72 of the pad 60 at a slope angle u of approximately 1–3 degrees.

As is best seen in the top view of FIG. 3 the triangular pads 20 in the preferred embodiment have the following approximate sizes, locations and relationships. Where the length of the burnishing edge 40 of a pad 20 is z, the width A of the head 10 is 3z and the length B of the head 10 is approximately 4z. The distance d between the pads 20 is approximately equal to the length l of a pad 20, and the corner angle y of the pads 20 is approximately 41°. The pad configuration depicted in the preferred embodiment 10 is particularly useful for a burnishing head 10 having a width A of approximately 1.5 mm having burnishing pads 20 formed with a height h of approximately 0.1–0.2 mm. Of course, burnish heads may be formed within the scope of the invention having a corner angle y that is different from approximately 41°, which generally results in changing the shapes and relative locations of the triangular pads, and changing the length B of the head 10.

While the triangular pad configuration depicted hereabove is a preferred embodiment for the burnishing head size described above, larger or smaller burnishing heads may advantageously be formed with a greater or fewer number of triangular pads which are disposed in configurations other than as depicted hereabove. These other configurations as may be advantageously developed, but which nonetheless include the multiple discrete burnishing pads of the embodiment 10 described hereabove, are considered by the inventor to be within the scope of the invention described herein. Additionally, burnishing heads having multiple discrete burnishing pads having shapes other than triangular, such as rectangular, square, and polygons which are each oriented to have a straight burnishing edge that is parallel to the front surface are also considered to be within the scope of the invention. A preferred manufacturing method for the burnishing head 10 is next described with the aid of FIG. 7.

Figure 7:
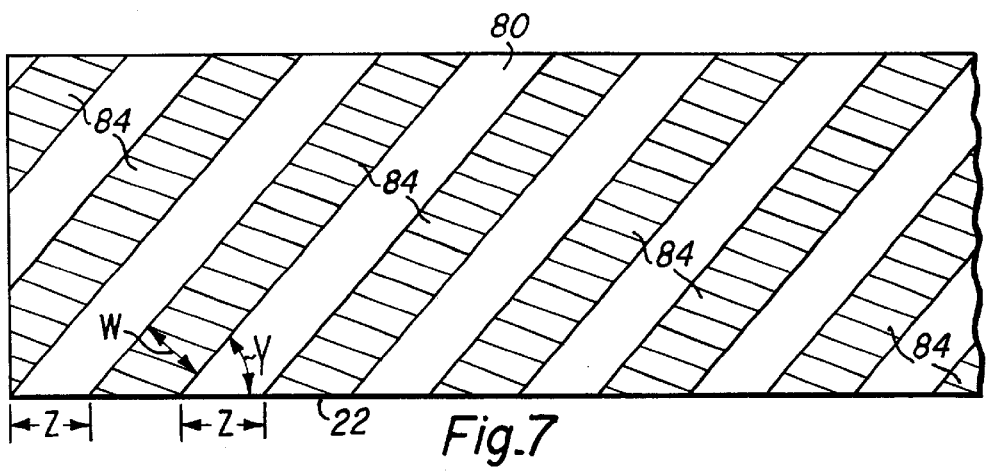
FIG. 7 is a top plan view depicting a first burnishing pad cutting step for manufacturing the burnishing head depicted in FIG. 2.
Figure 8:
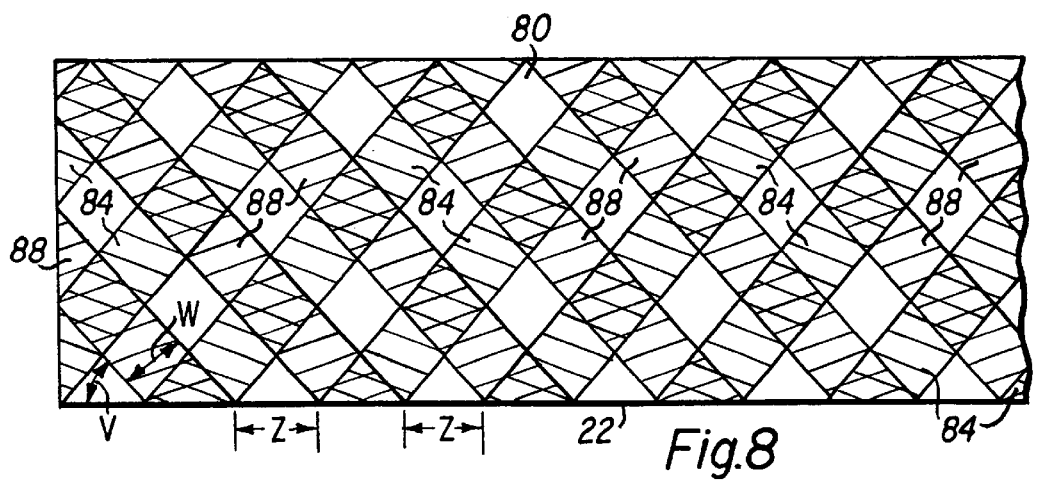
FIG. 8 is a top plan view depicting a second burnishing pad cutting step for manufacturing the burnishing head depicted in FIG. 2.
Figure 9:
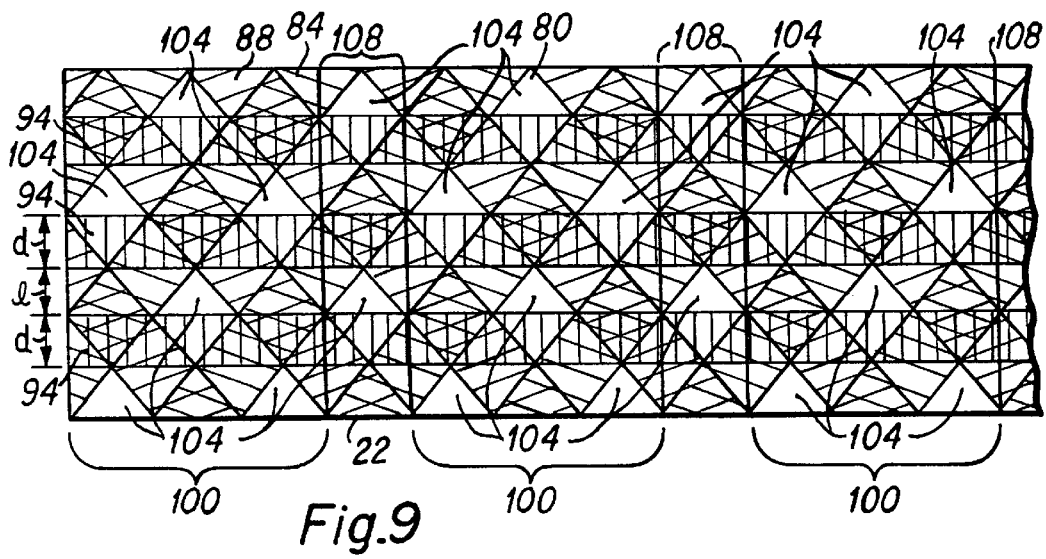
FIG. 9 is a top plan view depicting a third burnishing pad cutting step for manufacturing the burnishing head depicted in FIG. 2.

FIG. 7 depicts a strip 80 of ceramic material which is bonded to a grinding fixture (not shown), and from which a plurality of burnishing heads 10 are to be formed. As depicted therein, a first series of parallel cuts 84 have been made by a diamond saw into the surface of the strip 80. The cuts 84 are spaced apart a distance z along the front surface 22 of the strip 80, are made at an angle y of approximately 41 degrees to the front surface 22, and have a width w of w=zSiny. Thereafter, as depicted in FIG. 8, a second series of parallel cuts 88 are made in the surface of the strip 80 at an angle v (v=180°−y) of approximately 139 degrees. The cuts 84 are spaced a distance z apart on the front surface 22 of the strip 80 and also have a width w. Thereafter, as depicted in FIG. 9, a third series of parallel cuts 94 are made in the surface of the strip 80. The third series of cuts 94 are parallel to the front surface 22 of the strip 80 and are spaced the distance l (the length of the burnishing pads 40) apart. The third set of cuts 94 have a width d equal to l. It is therefore to be understood that when the three sets 84, 88 and 94 of diamond saw cuts have been made into the surface of the strip that a plurality of rough heads 100 have been formed in the strip 80, and each head 100 will have a plurality of triangular shaped rough pads 104. The height of the pads 104 will be equal to the depth of the cuts into the surface of the strip 80. Thereafter, the individual heads 100 are separated, cleaned, polished and finished to form a plurality of final burnishing head devices 10, as is next described.

After the series of three cuts 84, 88 and 94 are made in the strip, the individual rough heads 100 are diced off the strip at lines 108 and de-bonded from the grinding fixture (not shown). The individual heads 100 are cleaned and assembled on a fixture for the lapping and coating processes that follow. In the preferred manufacturing process approximately twenty rough heads 100 are aligned together on the fixture for efficient processing. Thereafter, a first hydrodynamic lapping of the rough pads 104 on the head 100 attached to the fixture is conducted utilizing a coarse grit hydrodynamic lapping device, as is known to those skilled in the art. Thereafter, the assembled heads are cleaned and a second hydrodynamic lapping is conducted using a fine grit hydrodynamic lapping device, as is known to those skilled in the art. Thereafter, the aligned heads are cleaned again. Thereafter, the front and rear tapers of the leading burnishing pads 44 and 48 and the trailing burnishing head 60 are formed by further lapping of the aligned heads 100 at the appropriate taper angle. The aligned heads are then cleaned again. Thereafter, a carbon thin film overcoating is preferably formed on the burnishing pads by placing the fixture with aligned heads into a vacuum chamber and applying the coating utilizing sputtering techniques that are well known to those skilled in the art. Thereafter, the aligned heads are de-bonded from the fixture, cleaned and inspected as finished individual burnishing heads 10.

To utilize the individual burnishing heads 10, each head is bonded to a suspension device 16, see FIG. 1, using an assembly positioning tool as is known to those skilled in the art. The head 10 and a suspension device are thereafter cleaned, preferably using ultrasonic cleaning at a low power level and thereafter at a high power level. The assembled burnishing head 10 may thereafter be inspected utilizing an optical interferometery instrument to determine the surface flatness of the pad outer surfaces 42 and the angle of the tapered surfaces 64. The suspension assembly and burnishing head is thereafter checked for its gram load characteristics. The burnishing head 10 of the preferred embodiment, with appropriate size and pad configuration characteristics is capable of acting as a slider and flying over the surface of a hard disk where the additional parameters such as the gram load of the burnishing head suspension assembly and the constant linear velocity of the hard disk to be burnished are appropriate.

While the invention has been shown and described with regard to certain preferred embodiments it is to be understood that certain alterations and modifications in form and detail will occur to those skilled in the art following review of this specification. It is therefore intended by the inventors that the following claims cover all such alterations and modifications that include the true spirit and scope of the invention set forth herein.

What I claim is:

1. A burnishing head for hard disk processing, comprising:
   a solid body including an upper surface, a burnishing pad surface and a front surface;
   a plurality of burnishing pads being disposed upon said burnishing pad surface, each said burnishing pad having a triangularly shaped outer surface and a burnishing edge that is generally parallel to said front surface, and wherein a left leading burnishing pad is formed on a left side edge of said front surface and a right leading burnishing pad is formed on a right side edge of said front surface.

2. The burnishing head as described in claim 1 wherein said burnishing pads are disposed in a configuration on said burnishing surface such that the burnishing edges of a plurality of said pads effectively form a combined burnishing edge that extends across a width of said head without any gaps in said combined burnishing edge.

3. The burnishing head as described in claim 2 wherein said burnishing pad configuration includes two said combined burnishing edges, wherein each of said combined edges extends across the width of said head.

4. The burnishing head as described in claim 1 wherein a third pad is disposed away from said front surface and within a gap formed between said left leading burnishing pad and said right leading burnishing pad.

5. The burnishing head as described in claim 1 wherein each said left and right leading burnishing pads are formed with a tapered outer surface that slopes towards said front surface.

6. The burnishing head as described in claim 1 wherein a rearward burnishing pad is formed on said burnishing surface, said rearward burnishing pad being formed with a tapered outer surface that slopes towards a rearward surface of said burnishing head.

7. A burnishing head for hard disk processing, comprising:
   a solid body having generally rectangular surfaces, including an upper surface, a burnishing pad surface, a front surface, a rear surface and two side surfaces;
   a plurality of burnishing pads being disposed upon said burnishing pad surface, each said burnishing pad having a triangularly shaped outer surface and a burnishing edge that is generally parallel to said front surface;
   wherein said burnishing pads are configured upon said burnishing pad surface such that two frontward leading pads are disposed proximate said front surface in a spaced apart relationship, one middle leading pad is disposed rearwardly of said two frontward leading pads and generally between said two frontward leading pads, two rear pads are disposed generally rearwardly of said middle leading pad in a spaced apart relationship, and one rearward pad is disposed rearwardly of said two rear pads and generally between said two rear pads; and
   wherein a left leading burnishing pad is formed on a left side edge of said front surface and a right leading burnishing pad is formed on a right side edge of said front surface.

8. The burnishing head as described in claim 7 wherein said two rear pads and said rearward pad have a combined burnishing edge that extends across a width of said head.

9. The burnishing head as described in claim 8 wherein said two front leading pads and said middle leading pad have a combined burnishing edge that extends across said width of said head.

10. The burnishing head as described in claim 7 wherein said rearward pad is formed with a tapered outer surface that slopes towards said rear surface of said head.

11. The burnishing head as described in claim 10 wherein said two front leading pads are formed with a tapered outer surface that slopes towards said front surface of said head.

* * * * *